United States Patent
Ohsawa et al.

(10) Patent No.: US 10,671,891 B2
(45) Date of Patent: Jun. 2, 2020

(54) REDUCING COMPUTATIONAL COSTS OF DEEP REINFORCEMENT LEARNING BY GATED CONVOLUTIONAL NEURAL NETWORK

(71) Applicant: INTERNATIONAL BUSINESS MACHINES CORPORATION, Armonk, NY (US)

(72) Inventors: Shohei Ohsawa, Tokyo (JP); Takayuki Osogami, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 132 days.

(21) Appl. No.: 16/039,679

(22) Filed: Jul. 19, 2018

(65) Prior Publication Data
US 2020/0026963 A1   Jan. 23, 2020

(51) Int. Cl.
G06K 9/00 (2006.01)
G06K 9/62 (2006.01)
G06N 3/08 (2006.01)
G06N 3/04 (2006.01)

(52) U.S. Cl.
CPC ....... G06K 9/6262 (2013.01); G06K 9/00503 (2013.01); G06N 3/04 (2013.01); G06N 3/08 (2013.01)

(58) Field of Classification Search
CPC .... G06K 9/6262; G06K 9/00503; G06N 3/04; G06N 3/08
See application file for complete search history.

(56) References Cited

U.S. PATENT DOCUMENTS

| | | | |
|---|---|---|---|
| 8,055,018 B2 * | 11/2011 | Han | G06K 9/00248 382/103 |
| 9,396,415 B2 | 7/2016 | Chertok et al. | |
| 9,424,493 B2 | 8/2016 | He et al. | |
| 2016/0328643 A1 * | 11/2016 | Liu | G06N 3/0454 |

(Continued)

OTHER PUBLICATIONS

Araghi et al., "An Implementation Image Edge and Feature Detection Using Neural Network", Proceedings of the International MultiConference of Engineers and Computer Scientists 2009 vol. I IMECS 2009, Mar. 2009, 3 pages.

(Continued)

*Primary Examiner* — Pakee Fang
(74) *Attorney, Agent, or Firm* — Tutunjian & Bitteto, P.C.; Vazken Alexanian (57) ABSTRACT

A method is provided for reducing a computational cost of deep reinforcement learning using an input image to provide a filtered output image composed of pixels. The method includes generating a moving gate in which the pixels of the filtered output image to be masked are assigned a first gate value and the pixels of the filtered output image to be passed through are assigned a second gate value. The method further includes applying the input image and the moving gate to a GCNN to provide the filtered output image such that only the pixels of the input image used to compute the pixels assigned the second gate value are processed by the GCNN while bypassing the pixels of the input image useable to compute the pixels assigned the first gate to reduce an overall processing time of the input image in order to provide the filtered output image.

20 Claims, 8 Drawing Sheets

(56) References Cited

U.S. PATENT DOCUMENTS

| | | | |
|---|---|---|---|
| 2017/0011280 A1 | 1/2017 | Soldevila et al. | |
| 2017/0337466 A1* | 11/2017 | Bayat | G06N 3/0454 |
| 2019/0115933 A1* | 4/2019 | Chen | H03M 7/6047 |
| 2019/0180154 A1* | 6/2019 | Orlov | G06K 9/72 |
| 2019/0294413 A1* | 9/2019 | Vantrease | G06F 7/5443 |

OTHER PUBLICATIONS

Mnih et al., "Recurrent Models of Visual Attention", NIPS'14 Proceedings of the 27th International Conference on Neural Information Processing Systems, Dec. 2014, pp. 1-9.

Szegedy et al., "Deep Neural Networks for Object Detection", NIPS'13 Proceedings of the 26th International Conference on Neural Information Processing Systems, Mar. 2013, pp. 1-9.

Xu et al., "Show, Attend and Tell: Neural Image Caption Generation with Visual Attention", Proceedings of the 32 nd International Conference on Machine Learning, Feb. 2015, vol. 37, 10 pages.

* cited by examiner

REDUCING COMPUTATIONAL COSTS OF DEEP REINFORCEMENT LEARNING BY GATED CONVOLUTIONAL NEURAL NETWORK

BACKGROUND

Technical Field

The present invention generally relates to machine learning, and more particularly to reducing computational costs of deep reinforcement learning by a gated convolutional neural network.

Description of the Related Art

In machine learning, reinforcement learning is a method to make an agent find an optimal action by obtaining a reward from an environment. Several methods using deep reinforcement learning, such as Google's Deep Q-Network (DQN) and AlphaGo®, outperformed humans at control in video games. These methods use a deep neural network to generalize given states and learn/predict a state-action value function Q. A deep neural network is typically made of deep Convolutional Neural Networks (CNNs) and a Fully-Connected Neural Network (FCNN).

A CNN converts an input image to recognize the image. Each luminosity in a pixel in an output image responses a certain pattern at a corresponding position in an input image. As used herein, the term "CNN" denotes a single-layer neural network composed of an input layer, a convolutional layer, and an output layer, and the term "deep CNN" denotes stacked CNNs to obtain higher "representativeness".

A CNN requires processing over an entire screen and, hence, does not scale to high resolution screens such as a 4K screen. Such processing has been made faster by reducing undesired computation. For example, although DQN, a method of deep reinforcement learning, remembers the last several frames and applies the CNN, it is not necessary to apply the CNN to all the frames because two neighboring frames in a video sequence are typically highly correlated to each other. Although we can consider a method to only learn the difference, such as method would nonetheless have to consider all of the pixels in order to compute such difference. Hence, there is a need for an approach to reduce the computational cost of deep reinforcement learning by gated CNNs.

SUMMARY

According to an aspect of the present invention, a computer-implemented method is provided for reducing a computational cost of deep reinforcement learning using an input image to provide a filtered output image composed of pixels. The method includes generating a moving gate in which the pixels of the filtered output image to be masked by the moving gate are assigned a first gate value and the pixels of the filtered output image to be passed through by the moving gate are assigned a second gate value. The method further includes applying, by a processor, the input image and the moving gate to a Gated Convolutional Neural Network (GCNN) to provide the filtered output image such that only the pixels of the input image used to compute the pixels assigned the second gate value are processed by the GCNN while bypassing the pixels of the input image useable to compute the pixels assigned the first gate to reduce an overall processing time of the input image in order to provide the filtered output image.

According to another aspect of the present invention, a computer program product is provided for reducing a computational cost of deep reinforcement learning using an input image composed of pixels. The computer program product includes a non-transitory computer readable storage medium having program instructions embodied therewith. The program instructions are executable by a computer to cause the computer to perform a method. The method includes generating a moving gate in which the pixels of the filtered output image to be masked by the moving gate are assigned a first gate value and the pixels of the filtered output image to be passed through by the moving gate are assigned a second gate value. The method further includes applying, by a processor, the input image and the moving gate to a Gated Convolutional Neural Network (GCNN) to provide the filtered output image such that only the pixels of the input image used to compute the pixels assigned the second gate value are processed by the GCNN while bypassing the pixels of the input image useable to compute the pixels assigned the first gate to reduce an overall processing time of the input image in order to provide the filtered output image.

According to yet another aspect of the present invention, a computer processing system is provided for reducing a computational cost of deep reinforcement learning using an input image composed of pixels. The system includes a memory device for storing program code. The system further includes a processor operatively coupled to the memory device for running the program code to generate a moving gate in which the pixels of the filtered output image to be masked by the moving gate are assigned a first gate value and the pixels of the filtered output image to be passed through by the moving gate are assigned a second gate value. The processor further runs the program code to apply the input image and the moving gate to a Gated Convolutional Neural Network (GCNN) to provide the filtered output image such that only the pixels of the input image used to compute the pixels assigned the second gate value are processed by the GCNN while bypassing the pixels of the input image useable to compute the pixels assigned the first gate to reduce an overall processing time of the input image in order to provide the filtered output image.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to reducing computational costs of deep reinforcement learning by a gated convolutional neural network. As used herein, the term "gated convolutional neural network" or "GCNN" refers to a convolutional neural network which uses a gate (also referred to herein as a "mask") to limit the processing of an image to less than all of an image. The gate identifies portions of an (output) image that are masked and portions of the (output) image that are not masked with respect to processing by the CNN. In this way, overall computation time for processing an input image is reduced. Masked portions are preferably redundant portions, for example, across multiple frames of a video sequence in order to avoid redundant processing of the same or similar image parts (e.g., a static background), thus improving the performance of a corresponding computer processing the image(s).

In an embodiment, the present invention provides an approach to reduce the computational cost of a CNN used for deep reinforcement learning by computing part of an image using masking. In addition, the approach can even be used by existing methods/techniques including, but not limited to DQN, in order to make the existing methods/techniques faster.

In an embodiment, the present invention involves the use of a Gated Convolutional Neural Network (GCNN) in order to make image processing faster by removing a part of the image. In an embodiment, the present invention can reduce the computation cost of processing the image to around ¾ (75%) of the typical required time, by using a gate to remove a part of information.

Figure 1:
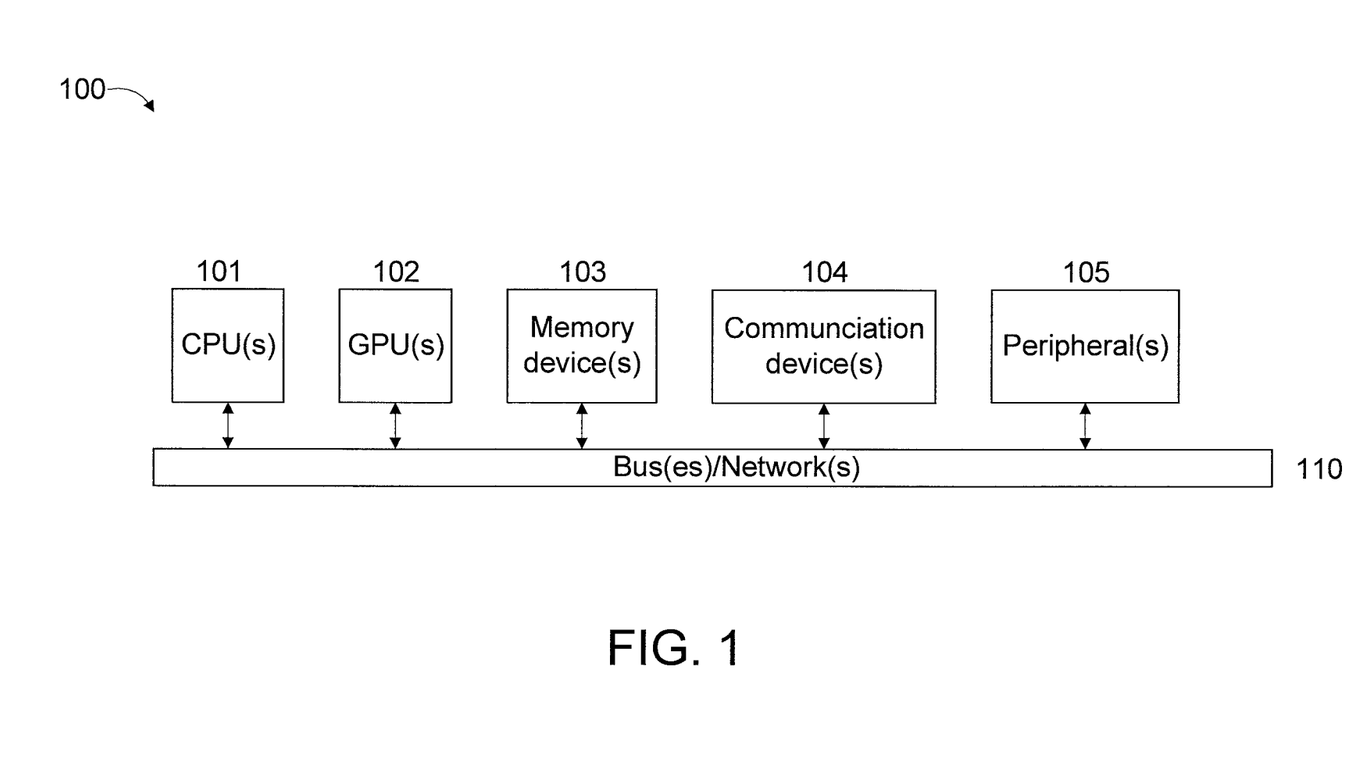
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 7-8). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
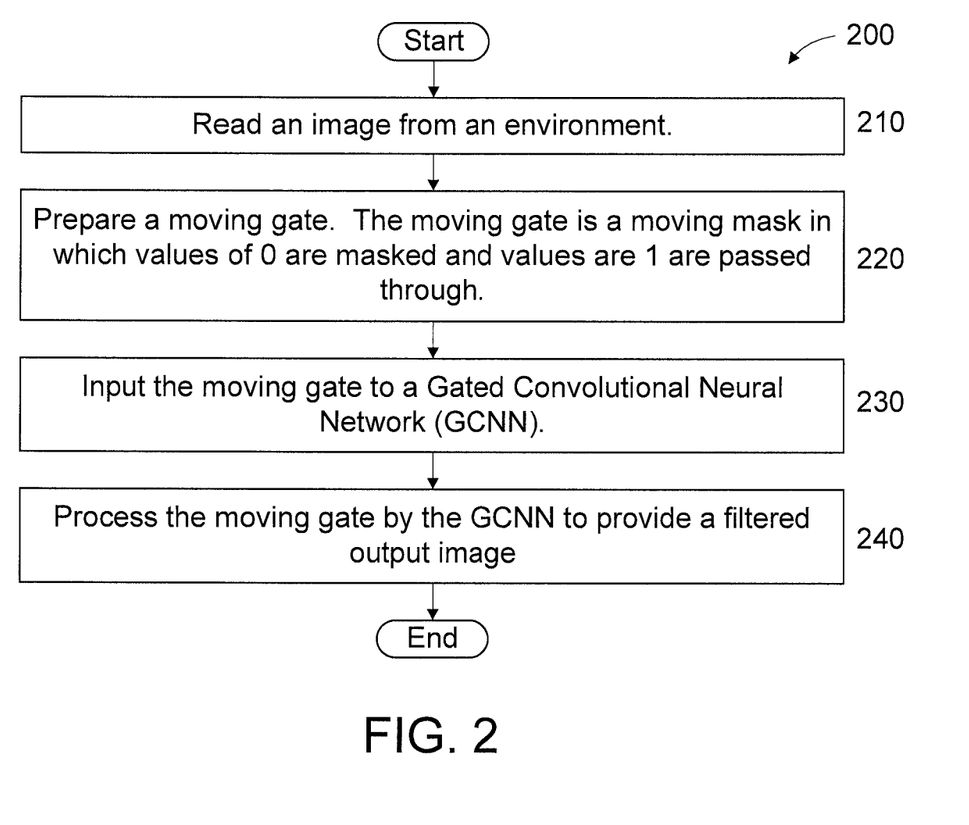
FIG. 2 is a flowchart showing an exemplary method for reducing a computational cost of deep reinforcement learning, in accordance with an embodiment of the present invention.

FIG. 2 is a flowchart showing an exemplary method 200 for reducing a computational cost of deep reinforcement learning, in accordance with an embodiment of the present invention.

At block 210, read an image from an environment. The image can be, for example, an image from a video sequence. This image is interchangeably referred to herein as "an original image".

At block 220, prepare a moving gate. The moving gate is a moving mask in which values of 0 are masked and values are 1 are passed through. Of course, other values or labels can be used to denote and differentiate masked pixels from unmasked pixels.

The moving gate can be at least partially prepared by an operator annotating the mask values (0 or 1), or by a computer. For example, the computer can perform pre-processing on the input image in order to prepare the mask based on features of the input image.

In an embodiment, the moving gate can be prepared relative to expected pixel values in an adjacent image(s). For example, the present invention is particularly suited to highly correlated images, such as those composing a video sequence, where the "skipping" of certain image regions using the mask nonetheless does not affect the overall sequence processing given the correlation to adjacent images which may already have those areas processed and which may be similar (e.g., a blue sky background from one image to another). That is, pre-processing can be performed to identify similar and/or identical image portions in different input images so that these images portions are processed only once and not for each different image in which they occur. These and other considerations for preparing a moving gate can be readily determined by one of ordinary skill in the art given the teachings of the present invention provided herein, while maintaining the spirit of the present invention.

At block 230, input the moving gate to a Gated Convolutional Neural Network (GCNN).

At block 240, process the moving gate by the GCNN to provide a filtered output image (in a reduced amount of time). Based on the configuration of the mask (in which 0s are masked, and is are passed through), the GCNN does not operate (process) pixels in which the gate value therefor is 0 (that is, for masked pixels). Accordingly, the computational cost is reduced relative to processing the entire image (in the absence of using the mask). Block 240 can be considered to be equivalent to the CNN reading the original image x the moving gate, while not actually operating using such multiplication as the same involves a somewhat high computational cost.

The filtered output image of the GCNN can be used to determine and perform an action in a corresponding RL environment to potentially obtain a reward for performing the action and further learning by a model involving the GCNN. The action can involve obstacle avoidance, robotic control, assembly line control, and so forth. These and other applications to which the GCNN of the present invention can be applied are readily determined by one of ordinary skill in the art, given the teachings of the present invention provided herein, while maintaining the spirit of the present invention.

Figure 3:
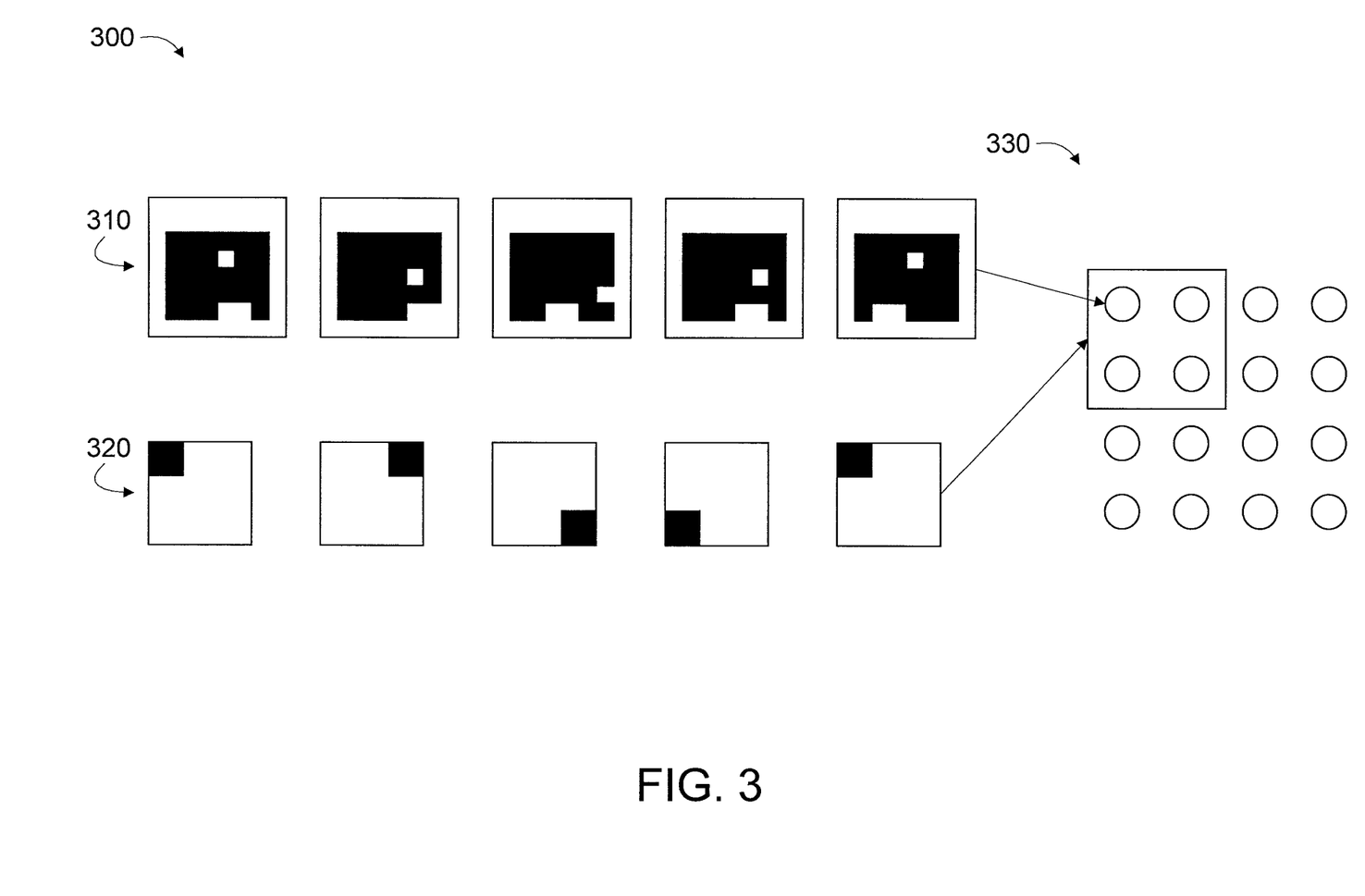
FIG. 3 is a block diagram showing an exemplary image processing using a moving gate, in accordance with an embodiment of the present invention.

FIG. 3 is a block diagram showing an exemplary image processing 300 using a moving gate, in accordance with an embodiment of the present invention.

The processing 300 involves an original image 310, a moving gate 320, and an output 330 of a GCNN. In an embodiment, the moving gate 320 has a size equivalent to the size of the output image (but the output image portion is shown larger in FIG. 3 for the sake of illustration). However, other sized gates can be used, as long as an orientation/reference point is determined for the mask relative to the original image to which is will be applied. In this way, smaller moving gates can be used, such that areas not covered by the gate can be presumed to be equivalent to a 1 (and hence will be passed through).

It is to be appreciated that in the illustrative embodiments described herein, the moving gate corresponds to the output rather than the input. A gate is used to mask a part of the output of a CNN. In an embodiment, the masked output is not computed. When only a part of the output needs to be computed, we do not need to process the whole input image or the whole intermediate layers. It is to be further appreciated that what regions of input and intermediate layers need to be process is determined by what part of the output needs to be computed. However, it is to be still further appreciated that the present invention is not limited to the application of a gate to the output, as a gate may also be applied to intermediate layers of a CNN or even the input.

In application, the GCNN is applied to the original image 310 and the moving gate 320 such that the GCNN applies a convolutional operation only to the unmasked pixels of the original image 310, i.e., those pixels whose corresponding mask value is equal to 1. Accordingly, the overall processing (computational) time is reduced since not all of the pixels of the original image 310 are processed by the GCNN (i.e., in particular, have a convolutional operation applied thereto).

Figure 4:
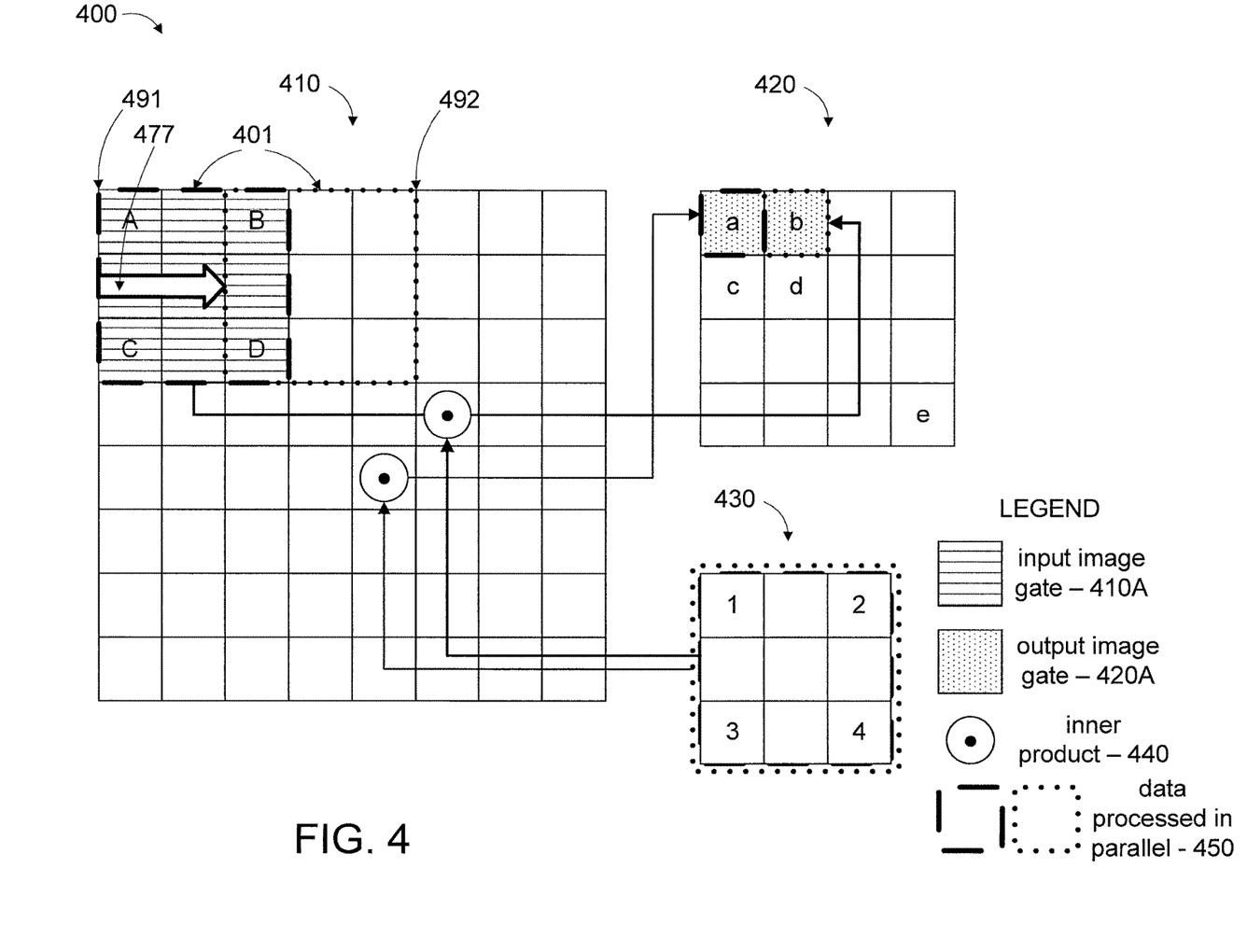
FIG. 4 shows is a block diagram showing exemplary GCNN processing, in accordance with an embodiment of the present invention.

FIG. 4 shows is a block diagram showing exemplary GCNN processing 400, in accordance with an embodiment of the present invention. The legend shown in FIG. 4 also applies to FIG. 5 hereinafter.

The GCNN processing 400 involves a moveable window 401, an input image gate 410A of an input plane 410, an output image gate 420A of an output plane 420, a filter plane 430, an inner product 440, and data 450 that will be processed in parallel.

The input image gate 410 is formed by applying the moveable window 401 to the input plane 410. The moveable window 401 is moved in units referred to herein as a "stride". That is, the term "stride" refers to the number of steps (pixels) that the window is moved at a given time. In this case, the stride equals 2, whereby the moveable window 401 is moved from a top corner position over to the right by two pixels (as indicated by arrow 477) such that the last column of 3 pixels from the prior position 491 now form the first column of 3 pixels in the new position 492. It is to be appreciated that while such overlap works well in practice, it is not necessary for invention operation. The GCNN operates the inner product 440 between the filter plane 430 and the input image plane 410 by moving the moveable window 401. That is, the inner product 440 is calculated between co-located pixels of the filter plane 430 and pixels of the input image plane 410. The inner product 440 can be calculated in parallel for at least two pixels of the input image plane 410 (that is, between at least two pixels of the input image plane 410 relative to co-located pixels in the filter plane 430). Such parallel processing can be implemented using multiple cores of a processing element (CPU, GPU, etc.). It is to be appreciated that this inner product refers to a standard operation of a convolutional neural network, where the inner product of a part of input and a filter is passed to the next layer. It is to be further appreciated that all pixels in each layer (plane) can be processed in parallel. Thus, all of "a", "b", "c", and "d" can be processed in parallel. However, what cannot be done in parallel is the computation across different layers, as a preceding layer needs to be processed before processing a succeeding layer.

Also, for the sake of clarity, it is to be appreciated that this filter is different from the mask of the invention. The filter is as in the standard CNN. The integers ("1"-"4") are arbitrary and can be other values. In FIG. 4, the mask is implicit. The fact that "a" and "b" in the output plane are computed implies that these parts of the output are not masked.

Figure 5:
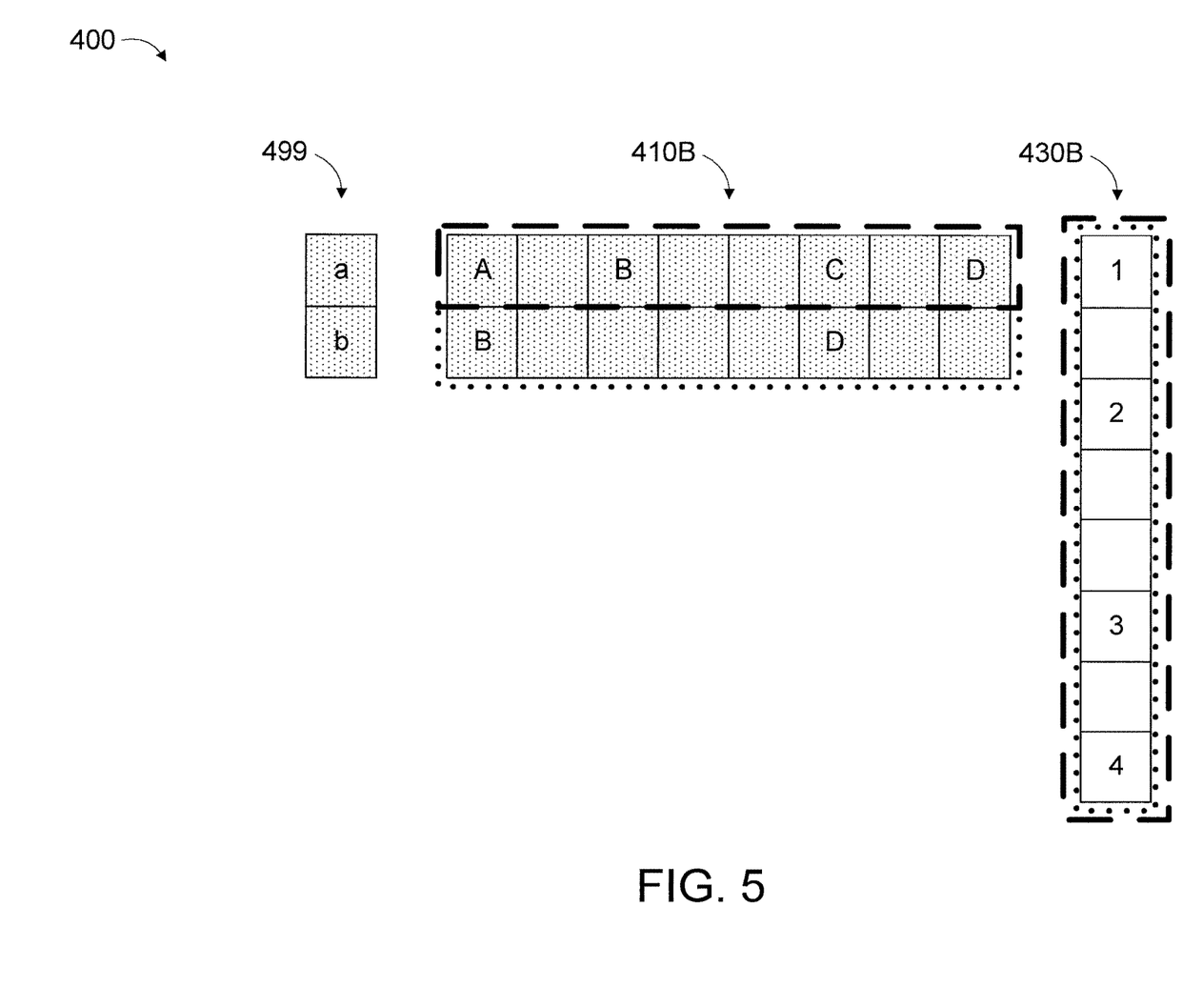
FIG. 5 is a block diagram showing furthering showing the exemplary GCNN processing of FIG. 4, in accordance with an embodiment of the present invention.

FIG. 5 is a block diagram showing furthering showing the exemplary GCNN processing 400 of FIG. 4, in accordance with an embodiment of the present invention. In particular, FIG. 5 shows that by using a filter 430B on some 410B of the pixels of the input plane 410, a filtered GCNN output 499 can be obtained.

Figure 6:
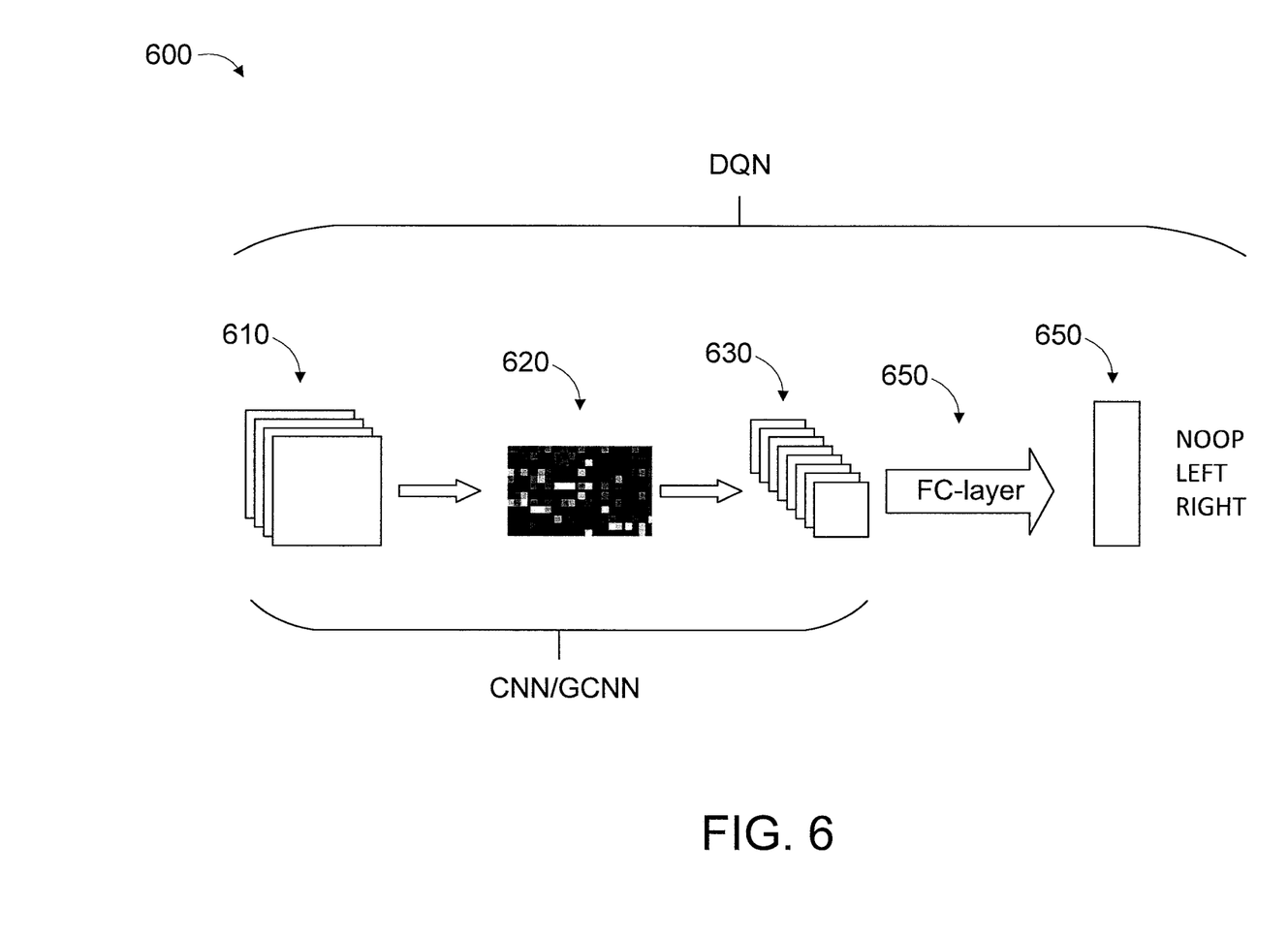
FIG. 6 is a block diagram showing an exemplary neural network structure, in accordance with an embodiment of the present invention.

FIG. 6 is a block diagram showing an exemplary neural network structure 600, in accordance with an embodiment of the present invention.

The neural network structure 600 involves a set of 4 recent frame 610 (of size 8×8), a set of 4×16 filters 620 (of size 3×3), 16 features (of size 4×4) 630, a fully connected layer 640, and a set of (3) actions 650. The set of actions 650 include NOOP, LEFT, and RIGHT, where "NOOP" denotes "No Operation" (is performed).

The neural network structure 600 can be considered to correspond to a DQN which is composed of a CNN/GCNN (involving elements 610, 620, and 630) and one fully connected layer.

Hence, the present invention can be applied to an input of a matrix composing pixels in an image. A local area is extracted from the input image, and an inner product operation is performed using a locate image (i.e., a filter). The operation (extraction of the local area and application of the filter) is performed repeatedly from the left to the right bottom of the image (where this repeated operation is also referred to as convolution). The filter can be designed to extract an edge corresponding to a certain direction and/or certain pattern and/or so forth. Other response criteria can be used including, but not limited to color, and so forth, as readily appreciated by one of ordinary skill in the art, given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
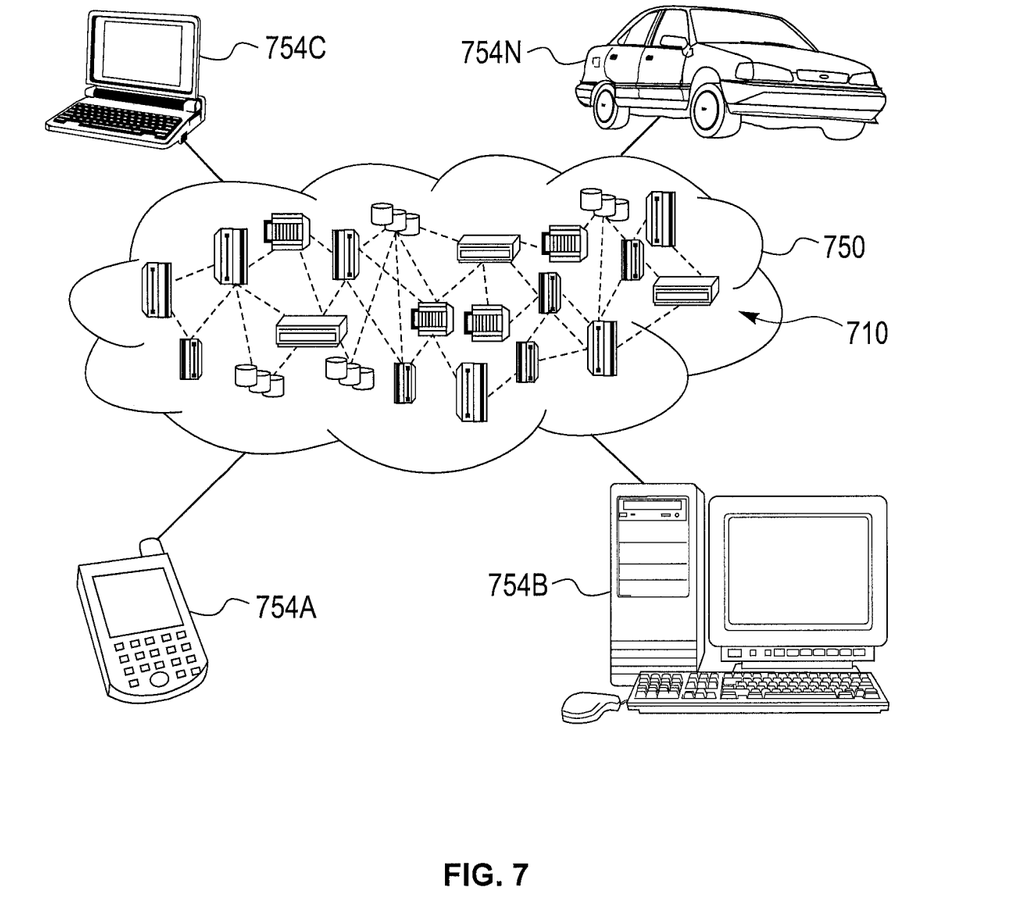
FIG. 7 is a block diagram showing an illustrative cloud computing environment having one or more cloud computing nodes with which local computing devices used by cloud consumers communicate, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
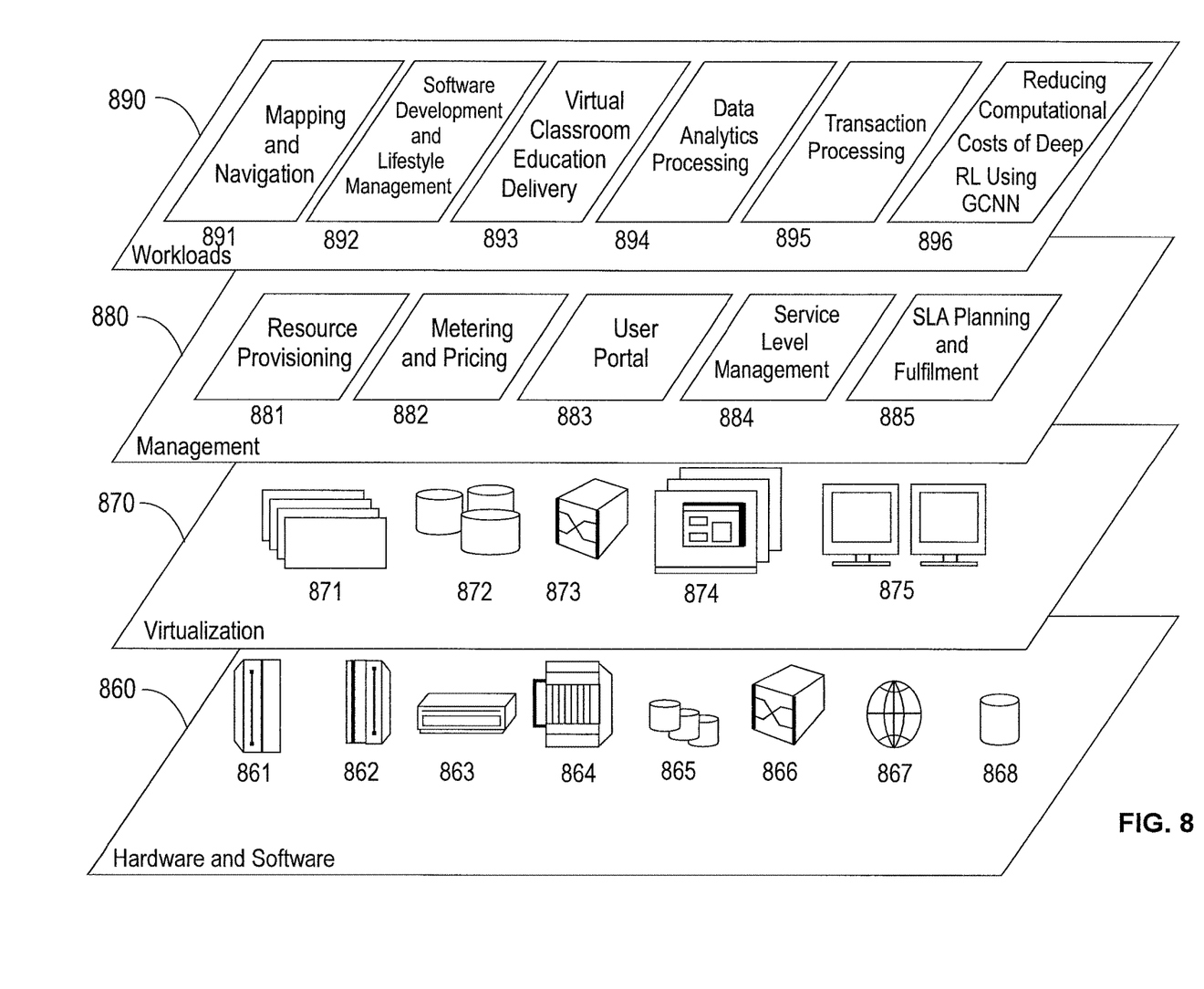
FIG. 8 is a block diagram showing a set of functional abstraction layers provided by a cloud computing environment, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and reducing computational cost of deep reinforcement learning by Gated Convolutional Neural Network (GCNN) 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for reducing a computational cost of deep reinforcement learning using an input image to provide a filtered output image composed of pixels, the method comprising:
generating a moving gate in which the pixels of the filtered output image to be masked by the moving gate are assigned a first gate value and the pixels of the filtered output image to be passed through by the moving gate are assigned a second gate value; and
applying, by a processor, the input image and the moving gate to a Gated Convolutional Neural Network (GCNN) to provide the filtered output image such that only the pixels of the input image used to compute the pixels assigned the second gate value are processed by the GCNN while bypassing the pixels of the input image useable to compute the pixels assigned the first gate to reduce an overall processing time of the input image in order to provide the filtered output image.

2. The computer-implemented method of claim 1, wherein the moving gate is composed of a moveable window configured for moveable application to the input image.

3. The computer-implemented method of claim 2, wherein said applying step comprising moving the moveable window across the input image in a top-to-bottom, left-to-right approach.

4. The computer-implemented method of claim 2, wherein the moveable window is moved during said applying step such that a rightmost column in the moveable window at a given position becomes a leftmost column in the moveable window at an immediately subsequent position relative to the given position.

5. The computer-implemented method of claim 1, wherein said applying step comprises computing an inner product between the input image and the moving gate.

6. The computer-implemented method of claim 5, wherein the inner product is computed between co-located ones of the pixels in the input image and the moving gate.

7. The computer-implemented method of claim 5, wherein said computing step is performed in parallel for at least two pixels of the input image.

8. The computer-implemented method of claim 1, further comprising forming the GCNN by substituting the GCNN for a CNN in a Deep Q Network (DQN).

9. The computer-implemented method of claim 1, wherein the image is comprised in a video sequence.

10. The computer-implemented method of claim 1, further comprising assigning different cores of the processor to different pixels of the input image for parallel processing.

11. The computer-implemented method of claim 1, further comprising applying a convolutional operation only to the pixels of the input image assigned the second gate value.

12. A computer program product for reducing a computational cost of deep reinforcement learning using an input image to provide a filtered output image composed of pixels, the computer program product comprising a non-transitory computer readable storage medium having program instructions embodied therewith, the program instructions executable by a computer to cause the computer to perform a method comprising:
generating a moving gate in which the pixels of the filtered output image to be masked by the moving gate are assigned a first gate value and the pixels of the filtered output image to be passed through by the moving gate are assigned a second gate value; and
applying, by a processor, the input image and the moving gate to a Gated Convolutional Neural Network (GCNN) to provide the filtered output image such that only the pixels of the input image used to compute the pixels assigned the second gate value are processed by the GCNN while bypassing the pixels of the input image useable to compute the pixels assigned the first gate to reduce an overall processing time of the input image in order to provide the filtered output image.

13. The computer program product of claim 12, wherein the moving gate is composed of a moveable window configured for moveable application to the input image.

14. The computer program product of claim 13, wherein the moveable window is moved during said applying step such that a rightmost column in the moveable window at a given position becomes a leftmost column in the moveable window at an immediately subsequent position relative to the given position.

15. The computer program product of claim 12, wherein said applying step comprises computing an inner product between the input image and the moving gate.

16. The computer program product of claim 15, wherein the inner product is computed between co-located ones of the pixels in the input image and the moving gate.

17. The computer program product of claim 15, wherein said computing step is performed in parallel for at least two pixels of the input image.

18. The computer program product of claim 12, wherein the method further comprises assigning different cores of the processor to different pixels of the input image for parallel processing.

19. The computer program product of claim 12, wherein the method further comprises applying a convolutional operation only to the pixels of the input image assigned the second gate value.

20. A computer processing system for reducing a computational cost of deep reinforcement learning using an input image to provide a filtered output image composed of pixels, the system comprising:
 a memory device for storing program code; and
 a processor operatively coupled to the memory device for running the program code to
  generate a moving gate in which the pixels of the filtered output image to be masked by the moving gate are assigned a first gate value and the pixels of the filtered output image to be passed through by the moving gate are assigned a second gate value; and
  apply the input image and the moving gate to a Gated Convolutional Neural Network (GCNN) to provide the filtered output image such that only the pixels of the input image used to compute the pixels assigned the second gate value are processed by the GCNN while bypassing the pixels of the input image useable to compute the pixels assigned the first gate to reduce an overall processing time of the input image in order to provide the filtered output image.

* * * * *